June 24, 1958 M. P. WINTHER 2,839,951
HYDROMECHANICAL TRANSMISSION FOR VEHICLES
Filed June 21, 1954 3 Sheets-Sheet 1

INVENTOR.
MARTIN P. WINTHER
BY
ATTORNEYS

June 24, 1958    M. P. WINTHER    2,839,951
HYDROMECHANICAL TRANSMISSION FOR VEHICLES
Filed June 21, 1954    3 Sheets-Sheet 2

INVENTOR.
MARTIN P. WINTHER
BY
ATTORNEYS

June 24, 1958  M. P. WINTHER  2,839,951
HYDROMECHANICAL TRANSMISSION FOR VEHICLES
Filed June 21, 1954  3 Sheets-Sheet 3

INVENTOR.
MARTIN P. WINTHER
BY
ATTORNEYS

United States Patent Office

2,839,951
Patented June 24, 1958

2,839,951

HYDROMECHANICAL TRANSMISSION FOR VEHICLES

Martin P. Winther, Gates Mills, Ohio, assignor to Eaton Manufacturing Company, Cleveland, Ohio, a corporation of Ohio Application June 21, 1954, Serial No. 438,253

9 Claims. (Cl. 74—677)

This invention relates to power transmissions for motor vehicles and, as one of its objects, aims to provide a transmission mechanism intended for heavy-duty service which will be very compact so as to require a minimum amount of space when used in a truck or the like, and in which a wide range of transmission ratios will be available to suit different operating conditions such that engine output and road speed of the vehicle can be maintained at maximum values at all times with minimum effort and fatigue for the driver.

Another object is to provide such a heavy-duty transmission employing a plurality of planetary gear sets in tandem relation affording a number of different transmission ratios and in which clutch means associated with control gear members of the planetary gear sets renders such gear sets selectively operable either in a so-called "locked-up" condition or as reduction gear devices.

A further object is to provide a transmission of this character in which such a plurality of planetary gear sets disposed in a tandem relation are adapted to be connected with a power input means through a torque multiplier, preferably a hydraulic torque converter, so as to afford other transmission ratios in addition to those of the planetary gear sets.

Still another object is to provide a hydromechanical transmission employing such a combination of hydraulic torque converter and tandem planetary gear sets in which the tandem gear sets are adapted to be connected directly with an input means by a through shaft member and in which the torque output of the torque converter is delivered to the output shaft means through a countershaft.

Additionally, this invention provides such a hydromechanical transmission by which the vehicle engine can be used as a braking means by the transmission of torque thereto, either through the direct connection of the gear sets with the input means or through the countershaft and torque converter, and in which the torque converter can also be used as a hydraulic braking device.

This invention can be further briefly summarized as consisting in certain novel combinations and arrangements of parts hereinafter described in detail and particularly set out in the claims hereof.

In the accompanying sheets of drawings forming a part of this specification:

Figure 1:
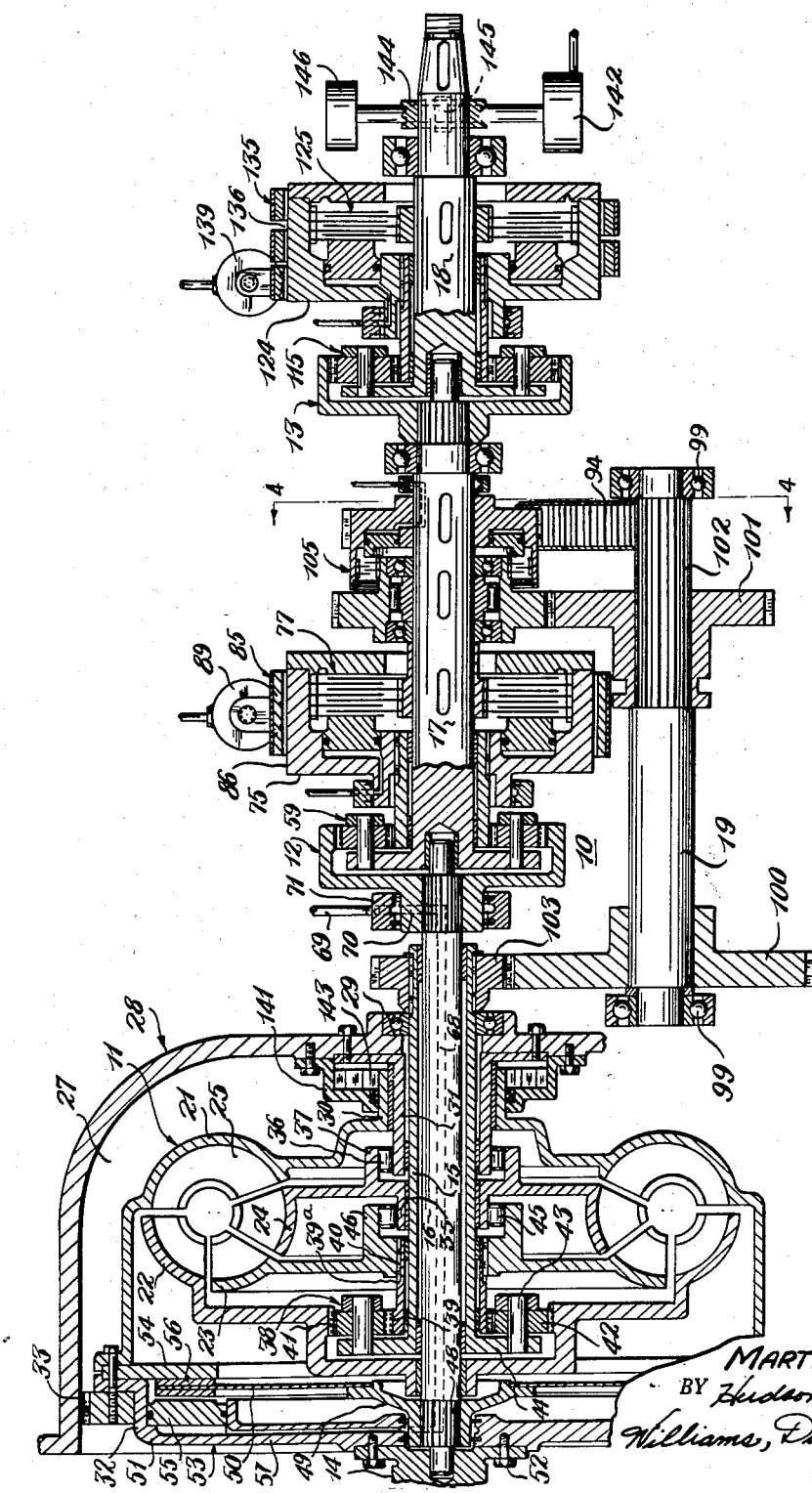
Fig. 1 is a longitudinal section taken through a hydromechanical transmission embodying this invention.

As a preferred embodiment of the invention, the drawings show a transmission 10 which comprises in general a torque multiplier in the form of a hydraulic torque converter 11 and a plurality of planetary gear units 12 and 13 disposed in a tandem relation to the torque converter. The transmission 10 also comprises coaxially aligned shafts 14, 15, 16, 17, and 18.

The shaft 14 is a rotatable input member such as the crankshaft or other power delivery shaft of a vehicle engine. The shaft member 15 is a hollow shaft through which the torque output of the hydraulic torque converter 11 is delivered. The shaft member 16 is a through shaft extending through the hollow shaft 15 and through which torque can be transmitted from the input shaft 14 independently of the torque converter 11. The shaft 18 is the driven shaft of the gear unit 13 and constitutes the final output shaft which is adapted to be connected with the driving axle and traction wheels of the vehicle. The shaft 17 is the driven shaft of the gear unit 12 and is an intermediate shaft extending between the through shaft 16 and the output shaft 18.

In addition to the shaft members just above described, the transmission 10 also includes a countershaft 19 located in by-pass relation to the gear unit 12 and whose purpose will be further described hereinafter.

The hydraulic torque converter 11 comprises a group of relatively rotatable bladed annular members 21, 22, 23, and 24 disposed in cooperating relation and defining a toroidal fluid path or circuit 25.

The bladed member 21 is a pump member which is adapted to be driven by the vehicle engine for causing the hydraulic fluid to be propelled as a velocity stream around the toroidal fluid circuit 25. The bladed members 22 and 23 are turbine members adapted to be driven by the velocity stream and which can be conveniently referred to as first and second turbine members. The bladed member 24 is a reaction member located between the second turbine 23 and the inlet portion of the pump member 21 and is inhibited against reverse rotation. The shape and inclination of the blades of the member 24, together with the holding of this member against reverse rotation, result in a reaction effect causing the velocity stream to be more effective on the turbine members 22 and 23. This reaction member also directs the fluid stream to the inlet portion of the pump member 21 after passing through the turbine members 22 and 23.

The torque converter 11 is rotatable in the chamber 27 of a stationary housing 28 from which the shaft members 15 and 16 project through the anti-friction bearing 29. The pump member 21 is provided with a central sleeve portion 30 by which this member is rotatably supported on an axially inwardly extending support sleeve 31 of the housing 28. The pump member 21 is rotatably driven by the input shaft 14 through a flywheel structure 32. A ring gear 33 carried by the flywheel structure 32 is adapted to be engaged by the driving pinion of a conventional starting motor.

The reaction member 24 is provided with a central sleeve portion 35 by which this member is rotatably mounted on the hollow shaft 15. The reaction member is inhibited against rotation in a reverse direction by a one-way brake 36. The one-way brake 36 is here shown as being of the roller type and is disposed between a sleeve portion 37 of the reaction member and the stationary mounting sleeve 31 of the housing 28.

The turbine members 22 and 23 are connected with the hollow shaft 15 for the delivery of torque thereto by means of a planetary gear set 38. This planetary gear set 38 comprises a sun gear 39, whose sleeve portion 39ª is connected with the second turbine 23 by a splined connection 40, and a ring gear 41 carried by the first turbine 22. The planetary gear set 38 also comprises a group of planet pinion gears 42 located between and having meshing engagement with the sun and ring gears 39 and 41. The planet pinion gears 42 are rotatable on pivot pins 43 of the planet pinion carrier 44.

The sun gear 39 and the second turbine 23 are held against rotation in a reverse direction by a one-way brake device 45. This one-way brake 45 is here shown as being of the roller type whose rollers are disposed between the sleeve portion 35 of the reaction member 24 and a sleeve portion 46 of the second turbine. The planet pinion carrier 44 is formed on or connected with the hollow shaft 15 such that when the carrier is driven by the ring gear 41, or by the combined action of the ring gear and the sun gear 39, the hollow shaft will constitute the torque delivery shaft of the torque converter 11.

The through shaft 16 is provided at its forward end with a splined section 48 by which this shaft member is connected with the hub 49 of a clutch disk 50. The flywheel structure 32 includes a drum member 51 defining a clutch housing which is secured to the input shaft 14 by the screws 52 and in which the clutch disk 50 is located.

The clutch disk 50 and the clutch housing 51 constitute parts of a clutch device 53 by which the shaft 16 is adapted to be connected with the input shaft 14 and which clutch device also includes a clutch ring 54 carried by the flywheel structure 32 and piston means 55 slidably operable in the clutch housing 51. The clutch disk 50 has suitable friction linings 56 presented toward the clutch ring 54 and the piston means 55. Hydraulic clutch actuating fluid supplied to the clutch housing 51 through the passage 57 is effective on the piston means 55 to cause the lining 56 to be frictionally pressed against the clutch ring 54 to thereby produce an engaged condition of the clutch 53 by which the clutch disk 50 and the shaft 16 are connected with the input shaft 14.

The planetary gearing 38 can be such as to have a torque amplification ratio of a desired value and the reaction member 24 can be such that by reason of its cooperation with the turbine members 22 and 23 the bladed members will also have a desired torque amplification ratio. The overall torque amplification ratio for the torque converter 11 can be, for example, a torque amplification ratio of 2.75 to 1.

Figure 2:
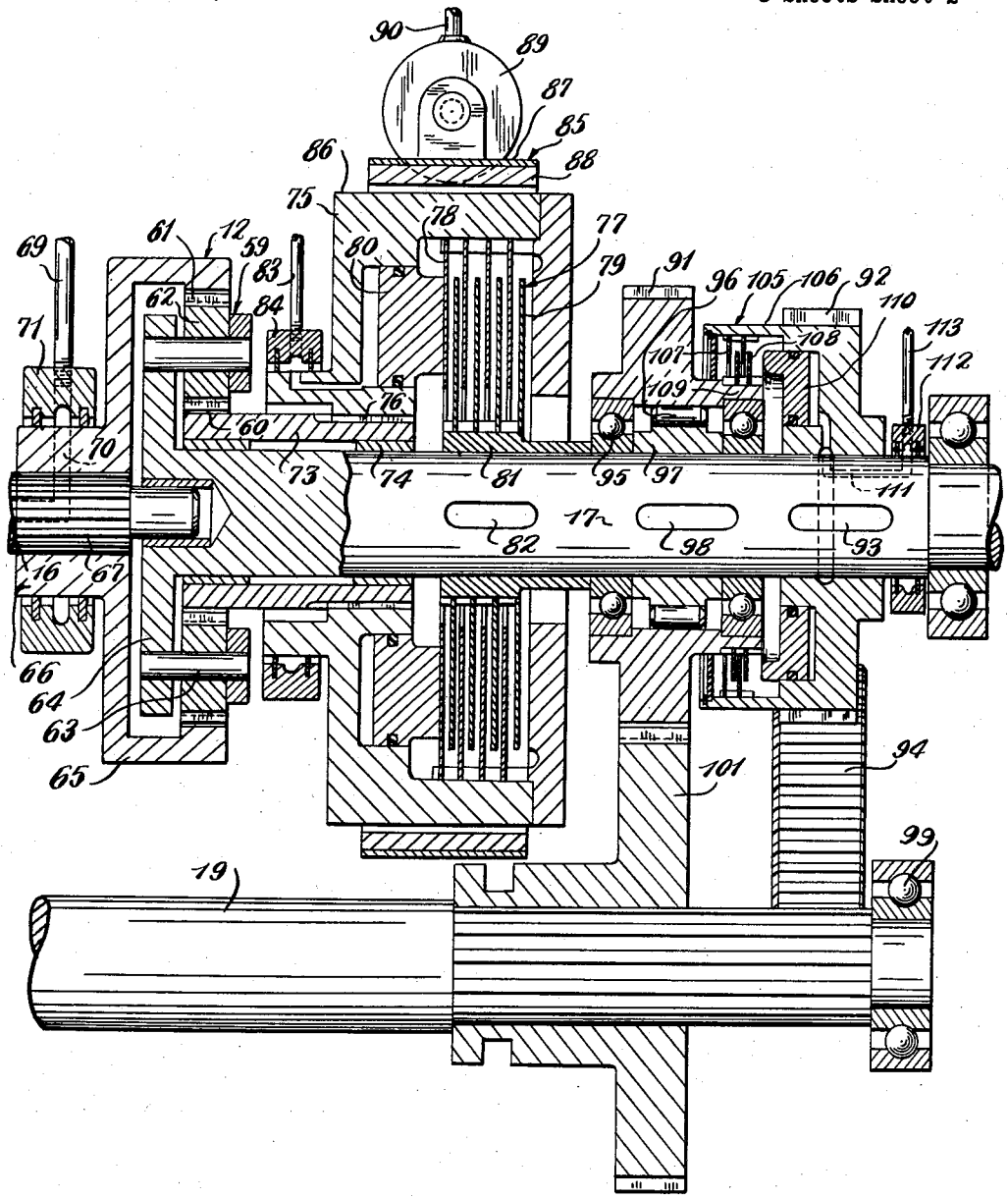
Fig. 2 is a partial longitudinal section corresponding with a portion of Fig. 1 and showing the first planetary gear set on a larger scale.

The gear unit 12 comprises a planetary gear set 59 through which the intermediate shaft 17 is adapted to be driven by the shaft member 16. This planetary gear set 59 (see Fig. 2) comprises sun and ring gears 60 and 61 and a group of planet pinion gears disposed between and meshing with such sun and ring gears. The planet pinion gears 62 are rotatable on pivot pins 63 of a planet pinion carrier 64. The carrier 64 is formed on or connected with the forward end of the intermediate shaft 17.

The ring gear 61 of the planetary gear set 59 is carried by a housing 65 in which this gear set is located and which housing includes a hub portion 66. The housing 65 is mounted on the rear end of the shaft 16 which projects from the hollow shaft 15 and is connected with such projecting rear end by the splined connection 67. The clutch actuating fluid for the above-described clutch device 53 includes an axial passage 68 formed in the shaft 16 and which axial passage is connected with a supply pipe 69 through a radial passage 70 of the hub portion 66 and a suitable gland 71 disposed around such hub portion.

The sun gear 60 of the planetary set 59 is carried by a sleeve 73 which is rotatably mounted on the shaft 17 by suitable bushings 74 and is connected with a rotatable housing 75 by a splined connection 76. A rotation control device in the form of a clutch device 77 is located in the housing 75 and comprises cooperating sets of clutch disks 78 and 79 and a clutch actuating piston means 80 slidably operable in the housing. The clutch disks 78 are carried by the clutch housing 75 and the clutch disks 79 are carried by a hub 81 which is secured on the shaft 17 as by means of a key 82.

When clutch actuating fluid is supplied to the clutch housing 75 through a supply pipe 83 and a gland 84, the piston means 80 applies pressure to the clutch disks for causing an engaged condition of the clutch 77. Such an engaged condition of the clutch 77 causes the sun gear 60 to be connected with the carrier 64 such that relative rotation therebetween is prevented and the planetary gear set 59 is then in the so-called locked-up condition, during which rotation of the housing 65 will cause the shaft 17 to be driven directly through the planetary gear set 59 at a 1 to 1 ratio.

The housing 75 of the clutch 77 also constitutes a part of a second rotation control device, namely, a brake device 85 of which it forms the brake drum 86. The brake device 85 also includes a brake band 87 extending around the drum 86 and carrying a friction lining 88 for engagement with such drum. The band 87 is adapted to be actuated by a suitable hydraulic cylinder device 89 for pressing the lining 88 into frictional engagement with the drum 86 to thereby produce an engaged condition of the brake device 85. Suitable actuating fluid for the cylinder device 89 can be supplied thereto through the pipe connection 90.

When the brake device 85 is in its engaged condition and the clutch device 77 is in its released condition, the housing 75 will be held against rotation and, likewise, the sun gear 60, such that the planetary gear set 59 will then be effective as a reduction gearing between the shaft 16 and the shaft 17. The planetary gear set 59 can have any suitable gear ratio such as a ratio of 1.66 to 1.

The gear unit 12 also comprises the above-mentioned countershaft 19 and a pair of gears 91 and 92 which are mounted on the shaft 17. The gear 92 is a reverse gear member which is secured to the shaft 17 as by means of a key 93 and meshes with a reverse idler gear 94. The gear 91 is rotatably mounted on the shaft 17 by anti-friction bearings 95 and is adapted to be drivingly connected with this shaft through a one-way clutch 96 of the roller type whose hub member 97 is secured to the shaft as by means of the key 98.

The countershaft 19 is suitably supported by structure including the anti-friction bearings 99 and carries gears 100 and 101, of which the former gear is keyed or otherwise secured to the countershaft and the latter gear is slidable on a splined portion 102 of the countershaft. The gear 100 is in meshed engagement with a gear 103 having a splined connection with the rear end of the hollow shaft 15. The gears 103 and 100 can have any desired ratio such as a ratio of 1 to 2.6. The gear 101 is shiftable on the splined shaft portion 102 so as to have a forward driving position in engagement with the gear 91, as shown in the drawings, or a reverse driving position in engagement with the reverse idler gear 94. The gear 101 may also be shiftable to a neutral position between the gears 91 or 94 in which it is fully disengaged from the latter gears and disconnects the torque converter 11 from the shaft 17.

The gear unit 12 also includes a clutch device 105 for establishing a drive connection between the reverse gear 92 and the gear 91 and by which reverse torque can be transmitted from the shaft 17 to the countershaft 19 during use of the vehicle engine for braking purposes. The clutch device 105 comprises a clutch housing 106 which is formed on or connected with the reverse gear 92 and carries a set of clutch disks 107. The clutch device 105 also comprises a set of clutch disks 108 carried by a hub extension 109 of the gear 91. A piston means 110 operable in the clutch housing 106 is adapted to apply pressure to the clutch disks 107 and 108 to thereby produce an engaged condition of the clutch device 105 by which the reverse gear 92 is connected in driving relation with the gear 91. Clutch actuating fluid is adapted to be supplied to the clutch device 105 through a passage 111 in the shaft 17, a gland 112 and a pipe 113 connected with the gland.

Figure 3:
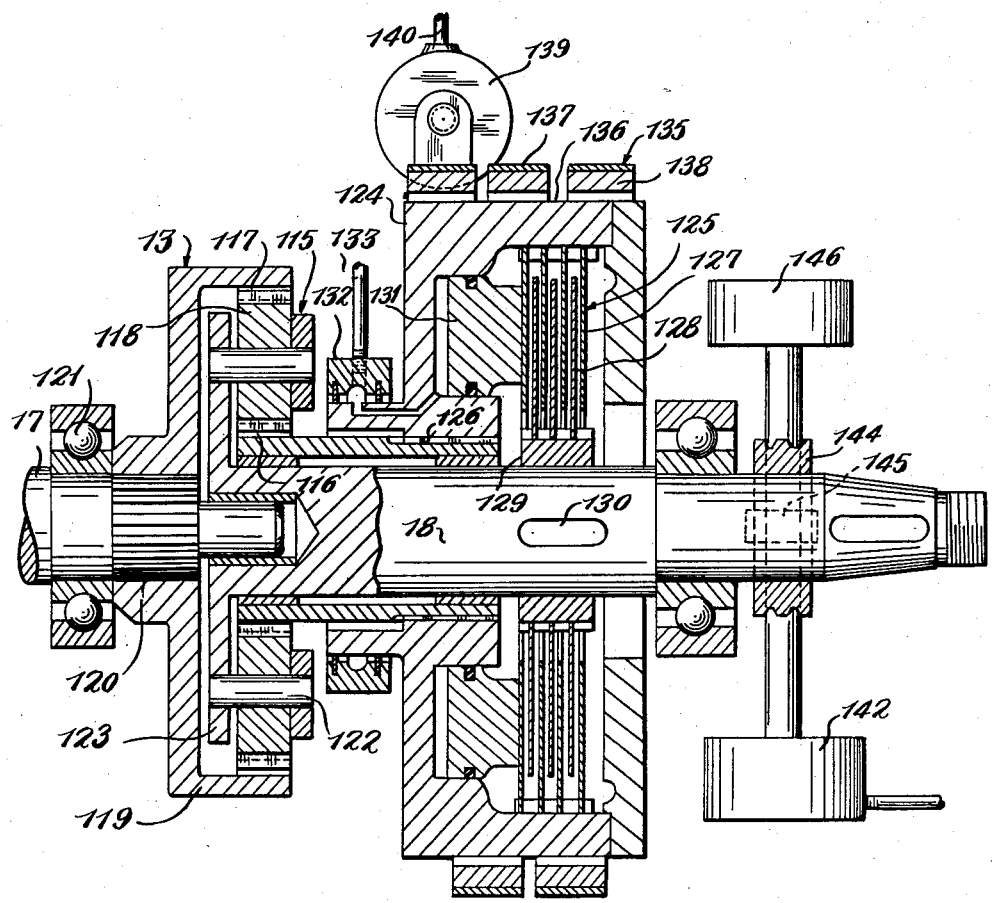
Fig. 3 is a partial longitudinal section corresponding with another portion of Fig. 1 and showing the second planetary gear set on a larger scale.
Figure 4:
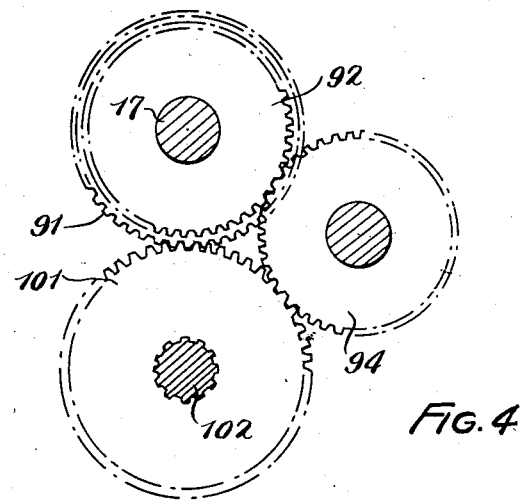
Fig. 4 is a partial transverse section taken on section line 4—4 of Fig. 1 and diagrammatically showing the reverse gear members.

The gear unit 13 (see Fig. 3) comprises a second planetary gear set 115 by which the output shaft 18 is adapted to be connected with the shaft 17 of the gear unit 12. The planetary gear set 115 comprises sun and ring gears 116 and 117 and a group of planet pinion gears 118 disposed between and in meshed engagement with such sun and ring gears. The sun gear 116 is carried by a rotatable sleeve similar to the above-mentioned sleeve 73 of the sun gear 60, but which is disposed in surrounding relation to the output shaft 18. The ring gear 117 is carried by a rotatable housing 119 in which this planetary gear set is located and which housing is driven by the shaft 17 through the splined connection 120. The housing 119 and the rear end of the shaft 17 are suitably supported as by means of the anti-friction bearing 121. The planet pinion gears 118 are rotatably supported by pivot pins 122 of a planet pinion carrier 123.

The sun gear 116 is connected with the housing 124 of a rotation control device in the form of a clutch device 125 by a splined connection 126. The clutch device 125 comprises sets of cooperating clutch disks 127 and 128, of which the clutch disks 127 are carried by the clutch housing 124 and the disks 128 are carried by a clutch hub 129 which is secured to the shaft 18 as by means of the key 130. A piston means 131 operable in the clutch housing 124 is adapted to apply pressure to the clutch disks 127 and 128 to produce an engaged condition of the clutch device 125. Clutch actuating fluid is adapted to be supplied to the clutch housing 124 through a gland 132 and a pipe 133 connected with such gland.

The planet pinion carrier 123 is formed on or connected with the forward end of the output shaft 18. When the clutch device 125 is thus engaged by actuation of the piston means 131, the sun gear 116 will be connected with the planet pinion carrier 123 such that relative rotation between these members is prevented and the planetary gear set 115 will then be in the so-called locked-up condition. When this planetary gear set is in such a locked-up condition, it transmits torque directly from the shaft 17 to the output shaft 18 at a 1 to 1 ratio.

The clutch housing 124 also constitutes a part of a rotation control device in the form of a brake device 135 in which it forms a brake drum 136. The brake device 135 also comprises a helical brake band 137 disposed around the brake drum 136 and a friction lining 138 carried by such band and adapted to be pressed thereby against the brake drum. Contracting movement is adapted to be imparted to the band 137 by a suitable cylinder device 139 to which actuating fluid is adapted to be supplied through the pipe 140.

When the band 137 is thus contracted around the drum 136 by the cylinder device 139 while the clutch device 125 is in its released condition, an engaged condition of the brake device 135 is produced by which the housing 124 and the sun gear 116 are held against rotation. When the sun gear 116 is held stationary, the planetary gear set 115 will operate as a reduction gearing in transmitting torque from the shaft 17 to the output shaft 18. This planetary gear set can have any desired torque amplification ratio such as a ratio of 1.3 to 1.

The hydraulic actuating fluid for the clutch devices 53, 77, 105, and 125 and for the cylinder devices 89 and 139 of the brake devices 85 and 135 can be obtained from any suitable pressure source such as the oil pumps 141 and 142. The pump 141 is here shown as being located in the housing 28 of the torque converter 11 and as having a rotor 143 which is driven by the sleeve portion 30 of the pump member 21. The pump 142 is here shown as being driven by the output shaft 18 through cooperating gear members 144 and 145. A governor device 146 is located adjacent the pump 142 and is also driven from the output shaft 18 through the gear members 144 and 145.

From the foregoing description and the accompanying drawings, it will now be readily seen that this invention provides a very practical hydromechanical transmission of a relatively simple and compact construction and by which a wide range of transmission ratios will be available to suit different vehicle operating conditions such that engine output and road speed can be maintained at maximum values at all times with minimum effort and fatigue for the driver.

It will now also be seen that the planetary gear sets of the gear units 12 and 13 will provide four different transmission ratios for cruising operation of the vehicle. On the basis of the gear ratios already mentioned herein, these cruising ratios will consist of a low-gear cruising ratio of 2.16 to 1, a second-gear cruising ratio of 1.66 to 1, a third-gear cruising ratio of 1.30 to 1, and a high-gear cruising ratio of 1 to 1.

The low-gear cruising ratio of 2.16 to 1 is obtained when the shaft 16 is connected directly with the input shaft 14 by engagement of the clutch device 53, and the planetary gear sets 59 and 115 of the gear units 12 and 13 have been rendered effective as reduction gearings by engagement of the brake devices 85 and 135 while the clutch devices 77 and 125 are released. The second-gear cruising ratio of 1.66 to 1 is obtained when the clutch devices 53 and 125 and brake device 85 are engaged while the clutch device 77 and the brake device 135 are released. During this condition of operation, the planetary gear set 59 is operating as a reduction gearing but the planetary gear set 115 will be in its locked-up condition.

The third-gear cruising ratio of 1.30 to 1 is obtained when the clutch devices 53 and 77, and the brake device 135 are engaged while the brake device 85 and the clutch device 125 are released. During this condition of operation the planetary gear set 115 is operating as a reduction gearing while the planetary gear set 59 is in its locked-up condition.

The high-gear cruising ratio of 1 to 1 is obtained when the clutch devices 53, 77, and 125 are engaged while the brake devices 85 and 135 are released. During this condition of operation, the planetary gear sets 59 and 115 are both in their locked-up condition and torque is transmitted directly from the input shaft 14 through the shaft members 16 and 17 to the output shaft 18.

The additional gear ratios provided by the hydraulic torque converter 11 can be referred to as a standard low-gear ratio and an emergency low-gear ratio. On the basis of the gear ratios mentioned above for the torque converter 11 and for the paired gear members 103, 100 and 101, 91, the standard low-gear ratio for the transmission 10 will be a ratio ranging between approximately 7.2 to 1 and 2.7 to 1. This range of standard low-gear ratios is obtained when the clutch device 125 is engaged while the clutch device 53 and the brake device 135 are released. During this condition of operation, the torque converter 11 is effective and its torque output is delivered to the shaft 17 through the hollow shaft 15, the paired gears 103 and 100, the countershaft 19, the paired gears 101, 91 and the one-way clutch 96. During this condition of operation the planetary gear set 115 of the gear unit 13 is in its locked-up condition.

The emergency low-gear ratio is a ratio ranging between approximately 9.4 to 1 and 3.4 to 1. This range for the emergency low-gear ratio is obtainable when the brake device 135 is engaged while the clutch devices 53 and 125 are released. During this condition of operation the torque output of the hydraulic torque converter 11 is being delivered to the shaft 17 through the countershaft 19 and is then transmitted to the output shaft 18 through the planetary gear set 115 while the latter is operating as a reduction gearing.

As is understood by those skilled in the transmission art, the characteristics of the hydraulic torque converter 11 are such that during the starting or stall condition of operation, the first turbine 22 will be rotated at a relatively high rate of speed by the velocity stream of hydraulic fluid, and, acting through the planetary gear set 38, will deliver through the hollow shaft 15 a high value of starting torque. When this torque output of the torque converter is further amplified by the paired gears 103, 100 and by the planetary gear set 115 of the gear unit 13, it may be as high as the above-mentioned high value of the emergency low-gear ratio of 9.4 to 1. As the speed of the input shaft 14 increases, rotation of the second turbine 23 will also increase and the resulting torque amplification of the torque converter 11 will decrease such that the emergency low-gear ratio will decrease to the above-mentioned low of 3.4 to 1 value. Similarly, the torque amplification ratios afforded by the torque converter 11, when the planetary gear set 115 is in its locked-up condition for the standard low-gear ratio mentioned above, will vary between the above-mentioned upper and lower ratio values of 7.2 to 1 and 2.7 to 1.

Although the hydromechanical transmission of this invention has been illustrated and described herein to a somewhat detailed extent, it will be understood, of course, that the invention is not to be regarded as being limited correspondingly in scope, but includes all changes and modifications coming within the spirit of the invention and the scope of the claims hereof.

Having thus described my invention, I claim:

1. In a transmission for motor vehicles, a rotatable input means, a rotatable output shaft, an intermediate rotatable shaft between said input means and said output shaft, a first planetary gear set connecting said intermediate shaft with said input means and comprising cooperating gear members including a first sun gear member, a sleeve rotatable about said intermediate shaft and connected with said first sun gear member, a second planetary gear set connecting said output shaft with said intermediate shaft and comprising cooperating gear members including a second sun gear member, a sleeve rotatable about said output shaft and connected with said second sun gear member, pairs of rotation control devices effective on the sun gear members of said gear sets through said sleeves for selectively rendering said gear sets operable either in a locked-up condition or as reduction gear devices, and countershaft means connecting said input means with said intermediate shaft in by-pass relation to said first gear set.

2. A transmission as defined in claim 1 in which said countershaft means includes a driven gear rotatable about said intermediate shaft and a one-way clutch adapted to connect said driven gear in driving relation to said intermediate shaft.

3. In a power transmission mechanism, a rotatable input means, a shaft to be driven, a planetary gear set connecting said shaft with said input means, a countershaft driven by said input means and disposed in by-pass relation to said gear set, a forward drive gear rotatable about said shaft, a reverse drive gear on said shaft and connected therewith, a gear splined on said countershaft and shiftable thereon for driving cooperation with either said forward drive gear or said reverse drive gear, a one-way clutch adapted to drivingly connect said forward drive gear with said shaft during the transmission of torque to said shaft from said input means through said countershaft, and a clutch device operable to connect said forward drive gear with said reverse drive gear to be driven by the latter during the transmission of torque from said shaft to said input means.

4. In a power transmission mechanism, a rotatable input means, a shaft to be driven, a planetary gear set connecting said shaft with said input means and comprising cooperating gear members including a control gear member, rotation control means effective on said control gear member for selectively rendering said gear set operable either in a locked-up condition or as a reduction gearing, a countershaft driven by said input means and disposed in by-pass relation to said gear set, a forward drive gear rotatable about said shaft, a reverse drive gear on said shaft and connected therewith, a gear splined on said countershaft and shiftable thereon for driving cooperation with either said forward drive gear or said reverse drive gear, a one-way clutch adapted to drivingly connect said forward drive gear with said shaft during the transmission of torque to said shaft from said input means through said countershaft, and a clutch device operable to connect said forward drive gear with said reverse drive gear to be driven by the latter during the transmission of torque from said shaft to said input means.

5. In a power transmission mechanism, a rotatable input means, a shaft to be driven, a planetary gear set connecting said shaft with said input means and comprising cooperating gear members including a control gear member, a pair of rotation control devices effective on said control gear member for selectively rendering said gear set operable either in a locked-up condition or as a reduction gearing, one device of said pair being a clutch device which is effective when engaged to connect said control gear member with said shaft for said locked-up condition and the other device of said pair being a brake device which is effective when engaged to hold said control gear member against rotation for operation of the gear set as a reduction gearing, a countershaft driven by said input means and disposed in by-pass relation to said gear set, a forward drive gear rotatable about said shaft, a reverse drive gear on said shaft and connected therewith, a gear splined on said countershaft and shiftable thereon for driving cooperation with either said forward drive gear or said reverse drive gear, a one-way clutch adapted to drivingly connect said forward drive gear with said shaft during the transmission of torque to said shaft from said input means through said countershaft, and a clutch device operable to connect said forward drive gear with said reverse drive gear to be driven by the latter during the transmission of torque from said shaft to said input means.

6. In a transmission, a rotatable input member, a torque multiplier, a pair of first and second rotatable shaft members of which the first shaft member is adapted to be driven substantially directly by said input member and the second shaft member is adapted to be driven from said input member through said torque multiplier, a rotatable shaft to be driven and being rotatable relative to said first and second shaft members, a planetary gear set connecting the last-mentioned shaft with said first shaft member and comprising cooperating gear members including a control gear member, rotation control means effective on said control gear member for selectively rendering said gear set operable either in a locked-up condition or as a reduction gearing, and countershaft means connecting said second shaft member with said last-mentioned shaft in by-pass relation to said planetary gear set.

7. In a hydromechanical transmission, a rotatable input member, a hydraulic torque converter, a pair of first and second rotatable shaft members of which the first shaft member is adapted to be driven substantially directly by said input member and the second shaft member is adapted to be driven from said input member through said torque converter, a rotatable shaft to be driven, a planetary gear set connecting the last-mentioned shaft with said first shaft member and comprising cooperating gear members including a control gear member, rotation control means effective on said control gear member for selectively rendering said gear set operable either in a locked-up condition or as a reduction gearing, a countershaft driven by said second shaft member and disposed in by-pass relation to said gear set, a forward drive gear rotatable about said shaft, a reverse drive gear on said shaft and connected therewith, a gear splined on said countershaft and shiftable thereon for driving cooperation with either said forward drive gear or said reverse drive gear, a one-way clutch adapted to drivingly connect said forward drive gear with said shaft during the transmission of torque to said shaft from said input means, and a clutch device operable to connect said forward drive gear with said reverse drive gear to be driven by the latter during the transmission of torque from said shaft to said input means.

8. In a hydromechanical transmission, a rotatable input member, a hydraulic torque converter, a pair of first and second rotatable shaft members of which the first shaft member is adapted to be driven substantially directly by said input member and the second shaft member is adapted to be driven from said input member through said torque converter, a rotatable intermediate shaft, a rotatable output shaft, said intermediate shaft being between said first shaft member and said output shaft and being rotatable relative to said first and second shaft members, first and second planetary gear sets connecting said intermediate and output shafts with said first shaft member in tandem relation thereto and comprising cooperating gear members including control gear members, rotation control devices effective on said control gear members for selectively rendering said gear sets operable either in a locked-up condition or as reduction gear devices, and countershaft means connecting said intermediate shaft with said second shaft member and disposed in by-pass relation to said first planetary gear set.

9. In a hydromechanical transmission, a rotatable input member, a hydraulic torque converter, a pair of first and second rotatable shaft members of which the first shaft member is adapted to be driven substantially directly by said input member and the second shaft member is adapted to be driven from said input member through said torque converter, a rotatable intermediate shaft, a rotatable output shaft, first and second planetary gear sets connecting said intermediate and output shafts with said first shaft member in tandem relation thereto and comprising cooperating gear members including control gear members, rotation control devices effective on said control gear members for selectively rendering said gear sets operable either in a locked-up condition or as reduction gear devices, a countershaft driven by said second shaft member and disposed in by-pass relation to said first gear set, a forward drive gear rotatable about said intermediate shaft, a reverse drive gear on said intermediate shaft and connected therewith, a gear splined on said countershaft and shiftable thereon for driving cooperation with either said forward drive gear or said reverse drive gear, a one-way clutch adapted to drivingly connect said forward drive gear with said intermediate shaft during the transmission of torque to said intermediate shaft from said second shaft member, and a clutch device operable to connect said forward drive gear with said reverse drive gear to be driven by the latter during the transmission of torque from said intermediate shaft to said second shaft member through said countershaft.

References Cited in the file of this patent

UNITED STATES PATENTS

| | | |
|---|---|---|
| 2,123,769 | Cotal | July 12, 1938 |
| 2,138,028 | Dooley | Nov. 29, 1938 |
| 2,298,649 | Russell | Oct. 13, 1942 |
| 2,466,318 | Kohr | Apr. 5, 1949 |
| 2,505,449 | Wemp | Apr. 25, 1950 |
| 2,585,437 | Claytor | Feb. 12, 1952 |
| 2,593,629 | Swift | Apr. 22, 1952 |
| 2,605,650 | Winther | Aug. 5, 1952 |
| 2,606,460 | Kelley | Aug. 12, 1952 |
| 2,616,310 | Jandasek | Nov. 4, 1952 |
| 2,623,411 | Herndon | Dec. 30, 1952 |
| 2,637,217 | Taylor | May 5, 1953 |
| 2,645,137 | Roche | July 14, 1953 |
| 2,689,030 | Wemp | Sept. 14, 1954 |
| 2,690,086 | Cook | Sept. 28, 1954 |
| 2,730,217 | Bower | Jan. 10, 1956 |
| 2,743,789 | Ferguson | May 1, 1956 |

FOREIGN PATENTS

| | | |
|---|---|---|
| 666,405 | France | May 21, 1929 |
| 671,609 | Germany | Feb. 14, 1939 |
| 597,814 | Great Britain | Feb. 4, 1948 |
| 1,044,901 | Great Britain | June 24, 1953 |